Patented Jan. 6, 1948

2,434,095

UNITED STATES PATENT OFFICE 2,434,095

PURIFICATION OF PHENOLIC MATERIAL

George W. Ayers, Chicago, Ill., assignor to The Pure Oil Company, Chicago, Ill., a corporation of Ohio No Drawing. Application September 14, 1944, Serial No. 554,145

16 Claims. (Cl. 260—621)

This invention relates to a method for obtaining pure phenols from admixtures containing phenols and thiophenols.

In the treatment of hydrocarbon oils, particularly gasoline, containing sulfur compounds, phenols and carboxylic acids, by means of alkali solutions, the used or spent alkali solution will contain phenolates, thiophenolates, mercaptides and alkali metal salts of the carboxylic acids present. Various methods have been proposed for recovering pure phenols from the spent alkali solution resulting from the treatment of hydrocarbon oils.

I have discovered that substantially pure phenols can be recovered from mixtures of phenols and thiophenols by subjecting the mixture to treatment with aqueous alkali solution in the presence of an alloy of a metal which is readily attacked by the aqueous alkali solution and a metal which is capable of functioning as a hydrogenation catalyst.

An object of the invention is to provide a method for recovering pure phenols from admixtures with thiophenols and other sulfur compounds.

Another object of the invention is to provide a method for converting sulfur compounds to hydrocarbons.

A further object of the invention is to recover pure phenols and other valuable constituents from spent aqueous alkali solution resulting from the treatment of hydrocarbon oils.

Other objects of the invention will become manifest from the following description.

In accordance with my invention, used or spent caustic alkali solution resulting from the treatment of hydrocarbon oils and containing phenolates, thiophenolates as well as mercaptides and carboxylic acid salts is acidified with a strong mineral acid such as hydrochloric or sulfuric acid, to liberate all the acidic constituents from the aqueous alkali solution and to obtain a composite "acid oil" containing phenols, thiophenols and carboxylic acids. The resulting "acid oil" is contacted with a fairly concentrated aqueous sodium or potassium hydroxide or carbonate solution in the presence of an alloy of a metal which is readily attacked by the alkali solution and a metal which acts as a hydrogenation catalyst. Alkali solutions equivalent to a sodium hydroxide content of at least 10% by weight should be used for best results. As metals which are readily attacked by the alkali solution and which may be used in the alloy may be mentioned, aluminum, silica, beryllium and zinc. As metals which act as hydrogenation catalysts which may be incorporated, may be mentioned, copper and nickel. Alloys which are useful in connection with my invention are disclosed in Patents Nos. 1,563,587, 1,628,190 and 1,915,473. An alloy of nickel and aluminum known as Raney nickel-aluminum alloy is particularly effective.

The amount of alkali solution and alloy contacted with the acid oil should be sufficient to generate enough hydrogen to convert all sulfur compounds present in the acid oil to hydrocarbons. The alloy is attacked by the alkali with the formation of hydrogen and an active hydrogenation catalyst. In the presence of the active hydrogenation catalyst, the hydrogen converts sulfur compounds such as thiophenols and mercaptans to hydrocarbons. Liberated hydrogen sulfide is absorbed in the alkali solution or reacts with nickel to form nickel sulfide. The completion of the reaction can be determined by "springing" the acid oil from the resulting alkali solution with acid and testing it with either mercuric cyanide or "doctor" solution and elementary sulfur to determine whether a white or black precipitate, respectively, is formed. The absence of a precipitate indicates the absence of thiophenols and mercaptans.

After treatment with the alkali solution and alloy is completed, the alkali solution containing phenolates and carboxylic acid salts may be neutralized to a pH of approximately 8 by means of flue gas or carbon dioxide. Neutralization to this point will release phenols from the alkali solution, but the carboxylic acid salts will be retained in solution. The liberated phenols can then be washed with water to obtain a mixture of pure phenols which may be used or sold as such for various purposes, or may be fractionated to obtain pure compounds. The partially neutralized alkali solution is then completely neutralized to liberate the carboxylic acids, including naphthenic acids and low-boiling fatty acids. The fatty acids and any phenol which may have remained dissolved in the aqueous solution may be washed from the naphthenic acid with water, leaving substantially pure naphthenic acids.

It may be desirable to subject the used or spent alkali to steam stripping or air blowing or other treatment to remove alkyl mercaptans from the solution prior to treatment of the spent alkali for recovery of the phenols.

Instead of acidifying the spent or used alkali to obtain acid oil, which is then subjected to treatment with alkali and aluminum-nickel or other alloy to recover penols, the alloy, such as nickel-aluminum, may be added directly to the spent or used alkali solution either with or without preliminary removal of alkyl mercaptans, thereby utilizing the alkali still remaining in the used alkali solution. In such case, care should be exercised that sufficient alkali is present in the spent solution to generate sufficient hydrogen to convert the sulfur compounds to hydrocarbons. In refinery practice, the amount of alkali remaining in the used solutions is generally sufficient to generate sufficient hydrogen when the alloy is added to convert all the sulfur compounds present.

The process may be carried out in any desired manner, as for example, by mixing powdered alloy with the spent caustic solution in an open or closed vessel until the reaction is complete as determined by testing a small portion of solution as above described.

Another method of carrying out the process is to pass spent alkali solution through a tower packed with comminuted aluminum-nickel or other appropriate alloy and continuously recirculate the solution therethrough until a sample of acid oil "sprung" from the solution gives no further evidence of sulfur compounds. Where acid oil is treated, acid oil and alkali solution may be re-circulated concurrently or countercurrently through a bed of alloy until the treatment is completed.

Instead of using only alloy, a mixture of metal readily attacked by alkali solution, such as aluminum and alloy, such as aluminum-nickel alloy may be used with the aluminum present in the major portion. Only a small amount of nickel, approximately 1 to 5% by weight of the material undergoing treatment, is necessary to catalyze the reaction. After active nickel is formed it remains in a highly active state as long as it is in the presence of alkali solution. Thus, it is only necessary to have sufficient aluminum or other metal present to insure an adequate supply of hydrogen. The process can be more economically practiced by using a mixture of a major portion of aluminum and a minor portion of nickel-aluminum alloy since the aluminum is cheaper than the alloy.

The treatment can be carried out satisfactorily at temperatures ranging from atmospheric to the boiling temperature of the alkali solution and at atmospheric pressure or pressures above atmospheric. The reaction proceeds rapidly at temperatures between approximately 38 and 90° C. Superatmospheric pressure decreases the time required to convert sulfur compounds to hydocarbons.

Hydrogen which is not consumed may be recirculated through the mixture undergoing reaction and thereby decrease the amount of alkali and aluminum or other metal necessary for complete removal of sulfur compounds.

In order to demonstrate my invention, the following experiments were carried out:

A mixture of 90 grams of commercial cresol and the grams of thiophenol was prepared. Ten grams of this mixture was dissolved in 300 cc. of ten percent sodium hydroxide solution. After heating the solution to 90° C., thirty grams of Raney nickel-aluminum alloy was added in small portions. The reaction mixture was stirred for one hour at 90° C. and then five grams additional Raney nickel-aluminum alloy and 50 cc. of ten percent sodium hydroxide solution were added. The mixture was decanted and the alkali solution was acidified with concentrated hydrochloric acid solution and the oily layer separated. This oily layer was washed with water. The material was taken up in ether and the ether layer was washed once again with water. To the washed material was added mercuric cyanide solution and no precipitate of mercuric mercaptide was formed. A portion of the ether extract was also tested with "doctor" solution (alkali solution of sodium plumbite) and gave a negative test.

Ten grams of "acid oil" containing mercaptans, thiophenols phenols and carboxylic acids, sprung from used aqueous alakli, resulting from treatment of high pressure cracked gasoline, by means of hydrochloric acid was treated in the same manner as the cresol-thiophenol mixture. The treated "acid oil" was free of mercaptans and thiophenols as determined by the mercuric cyanide and "doctor" tests.

In the foregoing examples the treatment was conducted at 90° C. and the second treatment with alkali solution and Raney nickel-aluminum alloy was carried out to insure complete removal of sulfur compounds.

It is claimed:

1. In the method of removing thiophenols from phenols the step comprising contacting a mixture of phenols and thiophenols with aqueous alkali solution in the presence of an alloy of an element selected from the group consisting of aluminum, silicon, beryllium and zinc and a metal selected from the group consisting of nickel and copper.

2. The method in accordance with claim 1 in which the alloy contains the metals aluminum and nickel.

3. The method in accordance with claim 1 in which the mixture is contacted with an amount of alkali solution and alloy to generate sufficient hydrogen to convert the entire thiophenol content of the mixture to hydrocarbons.

4. The method in accordance with claim 1 in which the mixture is contacted with the alkali solution at a temperature of approximately 38 to 90° C.

5. In the method of removing thiophenols from phenols, the step comprising contacting a mixture of phenols and thiophenols with aqueous alkali metal hydroxide solution and comminuted aluminum-nickel alloy in amounts to generate sufficient hydrogen to convert the entire thiophenolic content of the mixture to hydrocarbons.

6. Method in accordance with claim 5 in which the mixture is contacted with the aqueous solution and alloy at a temperature between approximately 38 and 90° C.

7. The method of recovering substantially pure phenols from used aqueous alkali metal hydroxide solution from the treatment of hydrocarbon oils containing phenols and thiophenols comprising contacting the used alkali with comminuted alloy of an element from the group consisting of aluminum, silicon, beryllium and zinc and a metal of the group consisting of copper and nickel in amount to generate sufficient hydrogen to convert the entire thiophenolate content of the used alkali to hydrocarbons.

8. Method in accordance with claim 7 in which the alloy is composed of aluminum and nickel.

9. The method in accordance with claim 7 in which the used alkali is contacted with the alloy at a temperature of approximately 38–90° C.

10. The method of recovering substantially pure phenols from used aqueous alkali metal hydroxide solution from the treatment of hydrocarbon oil containing phenols, thiophenols, mercaptans and carboxylic acids comprising removing mercaptans from the solution, contacting the resulting solution with comminuted aluminum-nickel alloy at a temperature of approximately 38–90° C., the alloy being present in amount to generate sufficient hydrogen to convert the entire thiophenolate content of the solution to hydrocarbons, neutralizing the resulting alkali solution to a pH of approximately 8 and separating the liberated phenols from the aqueous solution.

11. Method in accordance with claim 10 in which the resulting alkali solution is neutralized with flue gas.

12. The method of removing thiophenols from material containing phenols and thiophenols comprising contacting an alloy of at least one element from the group consisting of aluminum, silicon, beryllium and zinc and a metal from the group consisting of copper and nickel with an aqueous alkali solution until at least a portion of the element from the first mentioned group is dissolved and then contacting the material to be treated, with the treated alloy in the presence of aqueous alkali solution.

13. Method in accordance with claim 12 in which the alloy is a nickel-aluminum alloy.

14. The method of recovering phenols substantially free of thiophenols comprising contacting a mixture of phenols and thiophenols in the presence of aqueous alkali solution with a comminuted mixture of an alloy of an element from the group consisting of aluminum, silicon, beryllium and zinc and a metal from the group consisting of copper and nickel, and an element from the group consisting of aluminum, silicon, beryllium and zinc, the amount of said last mentioned element being present in major portion in said mixture.

15. Method in accordance with claim 14 in which the alloy is an alloy of aluminum and nickel and the metal is aluminum.

16. Method in accordance with claim 14 in which the method is carried out at temperatures between approximately 38° and 90° C., the alloy is an alloy of nickel and aluminum, the metal is aluminum and sufficient aluminum and alkali are present to generate sufficient hydrogen to convert substantially the entire thiophenol content to hydrocarbons.

GEORGE W. AYERS.

REFERENCES CITED

The following references are of record in the file of this patent:

UNITED STATES PATENTS

| Number | Name | Date |
| --- | --- | --- |
| 1,991,979 | Hartwig | Feb. 19, 1935 |

FOREIGN PATENTS

| Number | Country | Date |
| --- | --- | --- |
| 738,100 | France | Oct. 11, 1932 |